(12) United States Patent
Aradachi et al.

(10) Patent No.: US 7,446,508 B2
(45) Date of Patent: Nov. 4, 2008

(54) BATTERY CHARGER FOR CHARGING LITHIUM-ION BATTERY

(75) Inventors: Takao Aradachi, Hitachinaka (JP); Kazuhiko Funabashi, Hitachinaka (JP); Hiroyuki Hanawa, Hitachinaka (JP); Masayuki Ogura, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 387 days.

(21) Appl. No.: 11/396,642

(22) Filed: Apr. 4, 2006

(65) Prior Publication Data

US 2006/0220620 A1 Oct. 5, 2006

(30) Foreign Application Priority Data

Apr. 4, 2005 (JP) ............................ P2005-107536

(51) Int. Cl.
*H01M 10/46* (2006.01)

(52) U.S. Cl. ...................................... 320/150

(58) Field of Classification Search ................. 320/107, 320/110, 114, 150, 153
See application file for complete search history.

(56) References Cited

U.S. PATENT DOCUMENTS

2007/0252601 A1* 11/2007 Satoh et al. ................. 324/431

FOREIGN PATENT DOCUMENTS

| JP | 7-87673 | 9/1995 |
| JP | 8-185897 | 7/1996 |
| JP | 8-223815 | 8/1996 |
| JP | 11-55869 | 2/1999 |
| JP | 11-288744 | 10/1999 |
| JP | 2001-155783 | 6/2001 |

* cited by examiner

*Primary Examiner*—Edward Tso
(74) *Attorney, Agent, or Firm*—Antonelli, Terry, Stout & Kraus, LLP.

(57) ABSTRACT

A battery charger for charging a lithium-ion battery includes a temperature control unit and a current supplying unit. The temperature control unit controls a temperature of the lithium-ion battery to fall in a predetermined range. The predetermined range is divided into a plurality of sub-divided temperature ranges. The current supplying unit supplies the lithium-ion battery with a temperature-dependent current relation to a sub-divided temperature range in which the temperature of the lithium-ion battery falls.

29 Claims, 7 Drawing Sheets

| TEMP. RANGE | CELL TEMP. | CURRENT | HEATER | FAN |
|---|---|---|---|---|
| A | $T < -15°C$ | NONE | ON (INTENSE) | ON |
| B | $-15°C \leq T < 0°C$ | 1A | ON (INTERMEDIATE) | ON |
| C | $0°C \leq T < 15°C$ | 4A | ON (WEAK) | ON |
| D | $15°C \leq T < 35°C$ | 9A | OFF | OFF |
| E | $35°C \leq T < 55°C$ | 4A | OFF | ON |
| F | $55°C \leq T$ | NONE | OFF | ON |

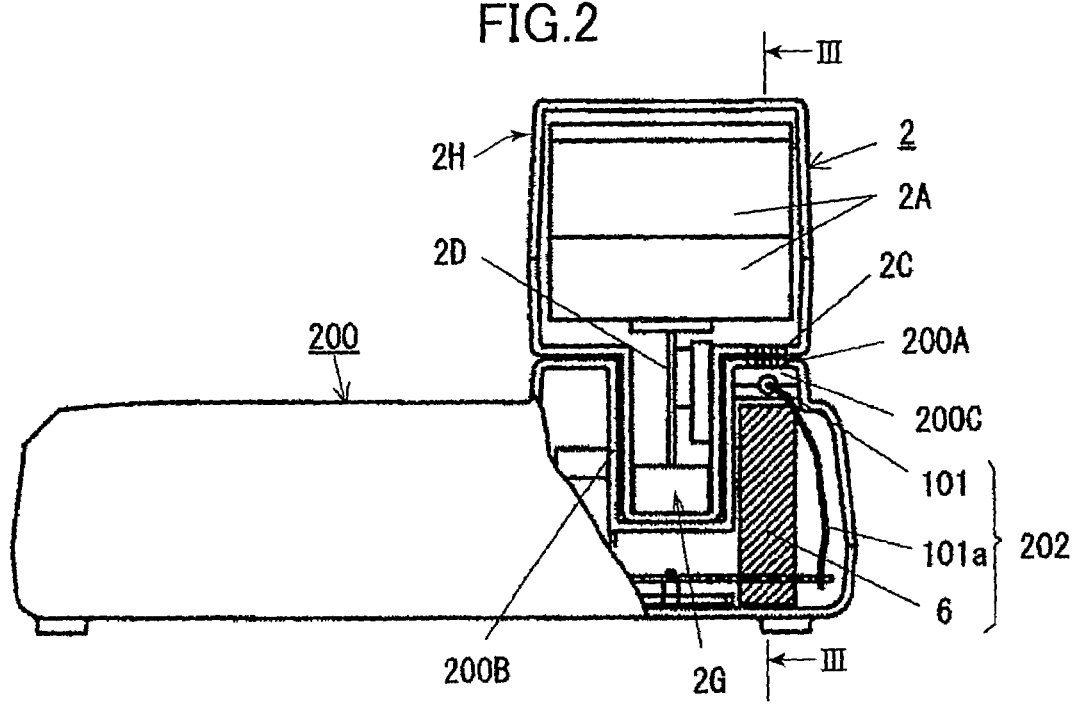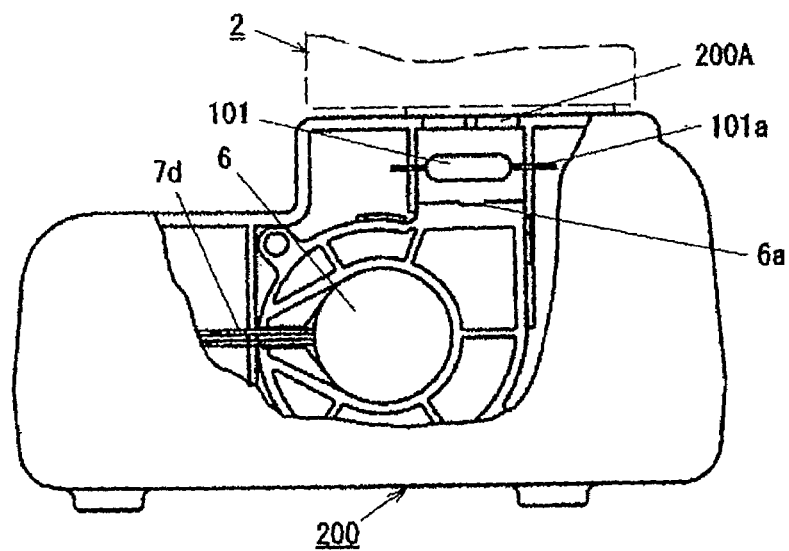

FIG.4

| CELL TEMP. | LED DISPLAY | STATE |
| --- | --- | --- |
| – | ORANGE-LIGHT BLINKING | BAT NOT INSERTED |
| $T < -15°C$ | RED-LIGHT BLINKING | WAIT AT LOW TEMP. |
| $-15°C \leq T < 55°C$ | ORANGE-LIGHT EMISSION | CHARGING |
| $55°C \leq T$ | GREEN-LIGHT BLINKING | WAIT AT HIGH TEMP. |
| – | GREEN-LIGHT EMISSION | CHARGING COMPLETED |

FIG.5

| TEMP. RANGE | CELL TEMP. | CURRENT | HEATER | FAN |
|---|---|---|---|---|
| A | T<-15°C | NONE | ON (INTENSE) | ON |
| B | -15°C≦T<0°C | 1A | ON (INTERMEDIATE) | ON |
| C | 0°C≦T<15°C | 4A | ON (WEAK) | ON |
| D | 15°C≦T<35°C | 9A | OFF | OFF |
| E | 35°C≦T<55°C | 4A | OFF | ON |
| F | 55°C≦T | NONE | OFF | ON |

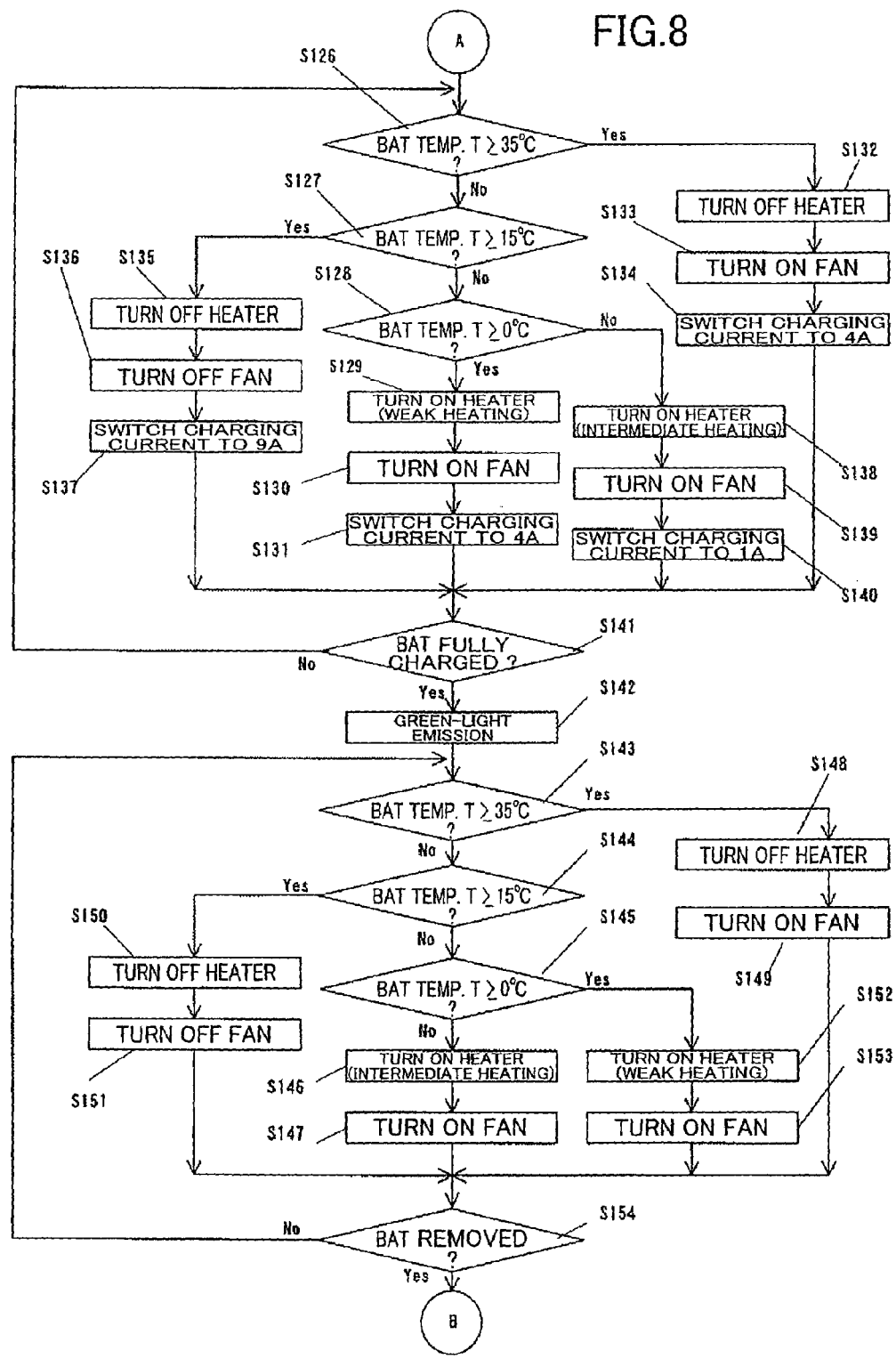

BATTERY CHARGER FOR CHARGING LITHIUM-ION BATTERY

BACKGROUND OF THE INVENTION

1. Field of the Invention

The present invention relates to an apparatus for charging a lithium battery while adjusting the ambient temperature of the lithium battery pack.

2. Description of Related Art

As mobile apparatuses are advancing, more and more large-capacity secondary batteries, such as nickel-cadmium batteries or nickel-hydrogen batteries, are used as power supplies in portable CD players with a radio receiver, portable video cameras, portable personal computers, communications devices such as cellular telephones, and power apparatuses such as cordless electric tools. Lithium battery that is one of the large-capacity secondary batteries is attracting attention as one for use in portable apparatuses, because the lithium battery can provide more electric power than the other types of secondary batteries.

The nominal voltage of the lithium battery is about two to three times greater than that of the nickel-cadmium battery or nickel-hydrogen battery. The energy density of the lithium battery is about three times higher than that of the nickel-cadmium battery. In addition, the lithium battery is small and light. Further, the discharge efficiency is high. The battery can discharge even in a relatively low-temperature environment, and can provide a constant voltage over a broad temperature range.

Taking these charactering features of the lithium battery into account, the inventors hereof have studied the use of the lithium battery pack as motor driving power supply in cordless electric tools such as impact drivers, so that the cordless electric tools may become as small and light as possible. It is preferable to make cordless electric tools, in particular, lighter as much as possible because workers keep holding the tools for a long time at the site where the tools are used. In view of the above circumstances, use of lithium batteries for the cordless electric tools is advantageous. Unlike other electronic apparatuses, cordless electric tools use a large motor. Therefore, use of the lithium battery, which has a large capacity (i.e., large discharge capacity), as a driving source is advantageous.

Chargers designed to charge battery pack incorporated in cordless electric tools are frequently brought to the working site such as construction site, together with cordless electric tools. If a cordless electric tool is used for a long time, the power of the battery pack used in the tool will decrease. As a result, the battery pack needs to be charged by the charger. Further, if the charger is used at a site in a cold region, the battery pack cannot be charged well. In view of this, the charger should have a function (rapid-charging function) of charging the battery pack as fast as possible and should charge the battery pack in conditions, where the charging-discharging function of the battery pack is not impaired.

Conventionally, chargers that have a function of controlling the environmental temperature (ambient temperature) of secondary batteries are well known. Japanese Patent Application Publication No. HEI 7-87673 discloses a charger that sets the ambient temperature of a secondary battery at a preset value before charging the secondary battery so that the discharge capacity of the secondary battery is not impaired.

Charging the battery at too low temperature will cause the electrolyte generating unnecessary gas. Charging the battery at too high temperature will shorten the lifetime of the battery. Therefore, Japanese Patent Application Publication No. HEI 8-185897 discloses a charger that sets the lower temperature limit to a value equal to or higher than a preset value, and sets the upper temperature limit to a value equal to or lower than a preset value.

Further, Japanese Patent Application Publication No. HEI 8-223815 discloses a charger that adjusts the ambient temperature of a secondary battery (e.g., lead storage battery) using a heating unit to prevent a decrease in the capacity of the secondary battery. Japanese Patent Application Publication No. HEI 11-55869 discloses a charger that adjusts the ambient temperature of a secondary battery within a predetermined range (0° C. to 40° C.) to prevent the battery performance from being degraded. Japanese Patent Application Publication No. HEI 11-288744 discloses a charger that charges a secondary battery at a predetermined temperature while controlling the temperatures of the plurality of batteries constituting a battery pack to become a same value.

Japanese Patent Application Publication No. 2001-155783 discloses a lithium-battery charger for use in artificial satellites, which prevents a non-aqueous electrolyte battery from freezing at low temperatures and prevents the battery from deteriorating at high temperatures, thereby to impart a stable charge-discharge characteristic to the battery.

The lithium secondary battery is different from the nickel-hydrogen secondary battery in nature. Therefore, the lithium battery must be charged by a method different from the above-described method of charging the nickel-hydrogen secondary battery, to maintain the charge-discharge characteristic or the long lifetime. If the lithium secondary battery is just charged at a constant current within a predetermined temperature range by the conventional method, the time of rapid charging cannot be shortened or the lifetime (charge-discharge cycle lifetime) of the lithium battery cannot be lengthened.

Further, the temperature of self-heating during the charging of the lithium secondary battery is low. If the lithium battery is charged at an ambient temperature lower than any temperature falling within the optimal charging-temperature range (e.g., 15° C. to 35° C.), the lithium battery must be charged at a low current, in consideration of the characteristic. The conventional charging method does not work only if the time of charging is shortened.

SUMMARY OF THE INVENTION

In view of the above-described drawbacks, it is an objective of the present invention to provide a battery charger for charging a lithium battery incorporated in a lithium battery pack, which can shorten the time of charging without impairing the performance of the battery, such as cycle lifetime.

Another object of the invention is to provide a battery charger for charging a lithium battery incorporated in a lithium battery pack, which can be used without lowering the performance of the battery, even if the ambient temperature of the battery or the battery charger is lower than any temperature falling within the optimal charging-temperature range.

Still another object of this invention is to provide a battery charger for charging a lithium battery, which can be used without lowering the performance of the battery, even if the ambient temperature of the cordless electric tool incorporating the battery is very low, for example below ice point.

In order to attain the above and other objects, the present invention provides a battery charger for charging a lithium-ion battery. The battery charger includes a temperature control unit and a current supplying unit. The temperature control unit controls a temperature of the lithium-ion battery to fall in a predetermined range. The predetermined range is divided into a plurality of sub-divided temperature ranges. The current supplying unit supplies the lithium-ion battery with a temperature-dependent current relation to a sub-divided temperature range in which the temperature of the lithium-ion battery falls.

Another aspect of the present invention provides a battery charger for charging a lithium-ion battery. The battery charger includes a temperature control unit, a memory, a current determining unit and a current supplying unit. The temperature control unit controls a temperature of the lithium-ion battery to fall in a predetermined range. The predetermined range is divided into a plurality of sub-divided temperature ranges. The memory stores a table that indicates a current relation to each sub-divided temperature range. The current determining unit identifies a sub-divided temperature range in which the temperature of the lithium-ion battery falls, and determines a current while referring to the table. The current supplying unit supplies the lithium-ion battery with the current by the current determining unit.

BRIEF DESCRIPTION OF THE DRAWINGS

The above and other objects, features and advantages of the invention will become more apparent from reading the following description of the preferred embodiments taken in connection with the accompanying drawings in which:

FIG. 2 is a partly sectional view of the battery charger and a battery pack;

FIG. 3 is a partly sectional view of the battery charger when the battery charger is cut by III-III line in FIG. 2;

FIG. 4 is a table illustrating how the monitor circuit provided in the battery charger operates;

FIG. 5 is a table illustrating how the battery charger operates;

FIG. 8 is a flowchart showing the battery-charging steps that follow the last step shown in FIG. 7.

DETAILED DESCRIPTION OF THE PREFERRED EMBODIMENTS

Figure 1:
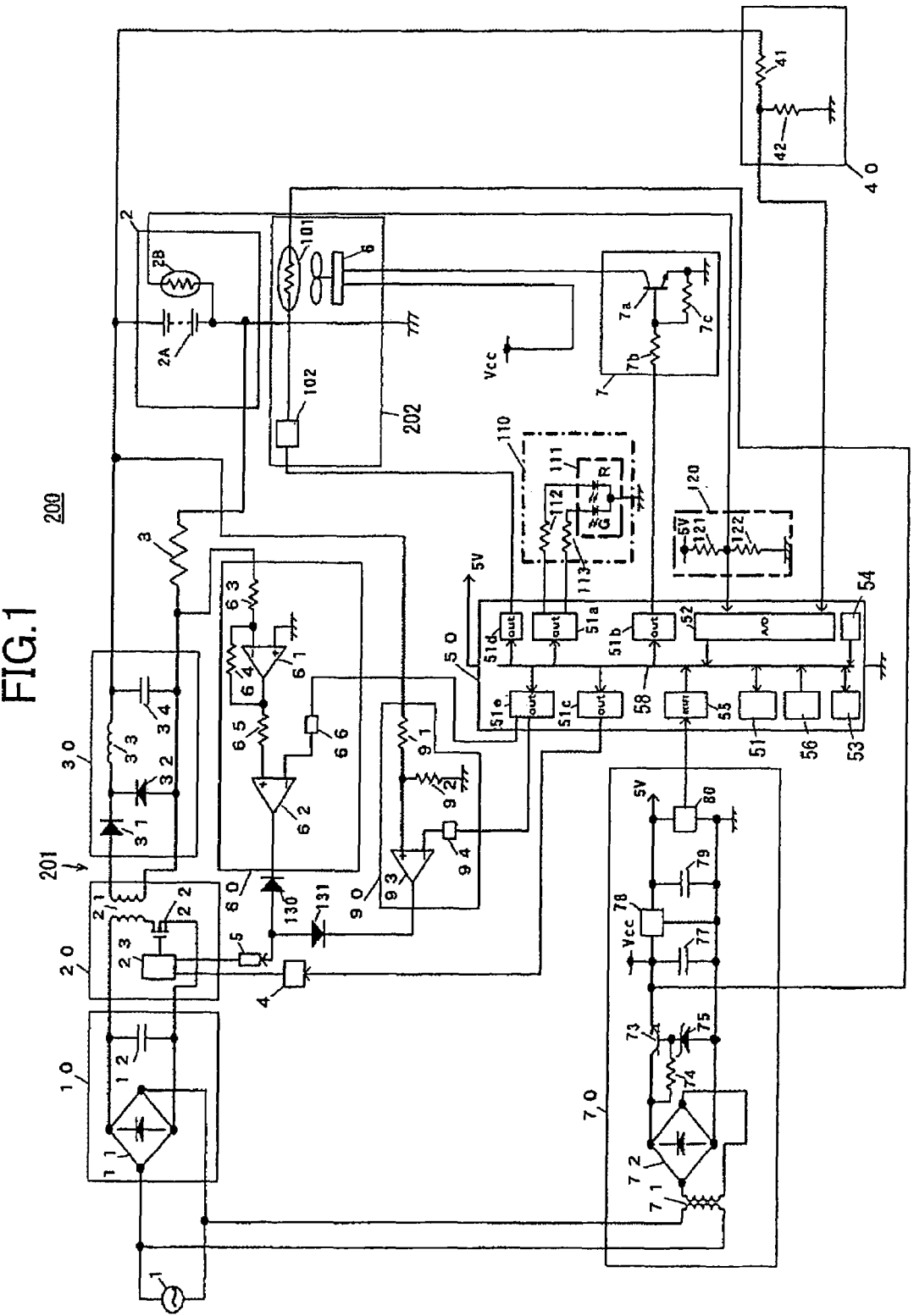
FIG. 1 is a circuit diagram showing a battery charger according to an embodiment.

A battery charger according to preferred embodiments of the present invention will be described while referring to the accompanying drawings wherein like parts and components are designated by the same reference numerals to avoid duplicating description.

In the following description, the expressions "front", "rear", "upper", "lower", "right", and "left" are used to define the various parts when the battery charger is disposed in an orientation in which it is intended to be used.

[Configuration of the Charging Apparatus]

FIG. 1 is a circuit diagram that shows a battery charger 200 according to the present embodiment. As shown in FIG. 1, a lithium battery pack 2 (hereinafter called battery pack) that is to be charged by the battery charger 200 is composed of a plurality of rechargeable lithium cells 2A and a temperature sensor 2B. The lithium cells 2A (hereinafter referred to as cells) are connected in series. The temperature sensor 2B (herein after referred to as sensor) is arranged in contact with, or adjacent to, the cells 2A (the battery pack 2) in order to detect the ambient temperature, that is the temperature of the battery pack 2 (hereinafter, referred to as battery temperature). The sensor 2B is, for example, a thermistor and functions as a temperature sensor. The cells 2A and the sensor 2B are encapsulated in a cell case (not shown) that is made of synthetic resin. Four cells 2A, each having nominal voltage of 3.6 V, are connected in series in the battery pack 2, for example. Hence, the battery pack 2 can provide a voltage of about 14.4 V.

The battery charger 200 is provided with a power-supplying unit 201, a charging-current control unit 60, a current-detecting unit 3, a constant-voltage control unit 90, a temperature-adjusting unit 202, a fan drive circuit 7, a microcomputer 50, a constant-voltage power supply 70, and a monitor circuit 110.

The power-supplying unit 201 includes a first rectifying/smoothing circuit 10, a switching circuit 20, and a second rectifying/smoothing circuit 30. The first rectifying/smoothing circuit 10 is composed of a full-wave rectifier 11 and a smoothing capacitor 12, and performs full-wave rectification on a current supplied from a commercially available AC power supply 1. The switching circuit 20 is composed of a high-frequency transformer 21, a MOSFET (switching element) 22, and a PWM control IC 23. The MOSFET 22 is connected in series to the primary coil of the transformer 21. The PWM control IC 23 modulates the pulse width of the drive pulse signal to be supplied to the gate electrode of the MOSFET 22, in accordance with a control signal input from the charging-current signal transmitting unit 5. Thus, the PWM control IC 23 adjusts the output voltage from the second rectifying/smoothing circuit 30 and the charging current for the battery pack 2. The second rectifying/smoothing circuit 30 is composed of diodes 31 and 32, a choke coil 33, and a smoothing capacitor 34 that are connected to the secondary coil of the transformer 21.

The charging-current control unit 60 and the constant-voltage control unit 90 are electrically connected to the power-supplying unit 201.

The charging-current control unit 60 is composed of operational amplifiers 61 and 62, input resistors 63 and 65, a feedback resistor 64, and a charging-current setting unit 66. The input of the charging-current control unit 60 is connected to the current-detecting unit 3 composed of a resistor or the like. The current-detecting unit 3 detects the charging current supplied to the battery pack 2. The output of the charging-current control unit 60 is electrically connected to the PWM control IC 23 via a diode 130 and the charging-current signal transmitting unit 5.

The charging-current setting unit 66 is connected to the inverting input terminal of the operational amplifier 62. The charging-current setting unit 66 is designed to set the magnitude of the charging current, in accordance with a control signal supplied from an output port 51e of the microcomputer 50 that functions as control unit as will be described later. That is, the charging-current setting unit 66 changes the voltage to be applied to the inverting input terminal of the operational amplifier 62, in accordance with the control signal supplied from the output port 51e. Thus, the charging-current control unit 60 controls the charging current for the battery pack 2 in accordance with the value set by the charging-current setting unit 66.

The constant-voltage control unit 90 has resistors 91 and 92, an operational amplifier 93, and a voltage-setting unit 94. The input of the constant-voltage control unit 90 is connected to the positive pole of the battery pack 2. The unit 90 therefore detects the charging voltage of the battery pack 2. The voltage-setting unit 94 is connected to the inverting input terminal of the operational amplifier 93. The voltage-setting unit 94 is designed to set the magnitude of the charging voltage in accordance with a control signal supplied from the output port 51e of the microcomputer 50.

The temperature-adjusting unit 202 is arranged near the battery pack 2 and adjusts the temperature of the battery pack 2 to fall within a charging-temperature range or an optimal charging-temperature range (described later). The temperature-adjusting unit 202 includes a fan 6, a heater 101 and a control circuit 102. The heater 101 is connected to the control circuit 102, which is constituted by, for example, an FET that functions a variable resistor element for controlling the heating current supplied to the heater 101. The control circuit 102 receives a control signal from an output port 51d of the microcomputer 50. In accordance with the control signal, the control circuit 102 switches on or off the supply of a current to the heater 101 to control the magnitude of this current.

The fan 6 includes a motor (not shown), which is driven and stopped by the fan drive circuit 7. The fan drive circuit 7 is composed of a transistor 7a and bias resistors 7b and 7c. As described later, the fan drive circuit 7 is controlled by a control signal supplied from an output port 51b of the microcomputer 50. The temperature-adjusting unit 202 may include a cooling device such as a Peltier element in addition to the fan 6 if the battery charger 200 is used at an ambient temperature that is much higher than the upper limit of the optimal charging-temperature range and the battery pack 2 must therefore be positively cooled.

The microcomputer 50 controls the power-supplying unit 201, charging-current control unit 60, constant-voltage control unit 90 and temperature-adjusting unit 202. The microcomputer 50 includes a central processing unit (CPU) 51, a read only memory (ROM) 56, a random access memory (RAM) 53, and a timer 54. The CPU 51 executes control programs. The ROM 56 stores the control programs that the CPU 51 executes. The RAM 53 is used as work area for the CPU 51 and temporary data-storage area. The microcomputer 50 further includes an A/D converter 52, output ports 51a, 51b, 51c, 51d and 51e, and a reset input port 55. The A/D converter 52 converts analog input signals to digital output signals. The output ports 51a to 51e are provided to output control signals. The reset input port 55 is provided to receive a reset signal when the power switch on the battery charger 200 is turned on. The ROM 56 stores a table (FIGS. 4 and 5) that indicates a current relation to each sub-range (described later). These function blocks are connected to one another by an internal bus 58.

A temperature sensing signal generated by the sensor 2B is input to one input terminal of the A/D converter 52 through a battery-temperature detecting unit 120. The battery-temperature detecting unit 120 is composed of resistors 121 and 122.

The voltage of the battery pack 2 is applied to the other input terminal of the A/D converter 52 through a battery-voltage detecting circuit 40. The battery-voltage detecting circuit 40 is composed of voltage-dividing resistors 41 and 42.

A control signal that starts or stops the charging of the battery pack 2 is supplied from the output port 51c to the PWM control IC 23 via a charging-control-signal transmitting unit 4, in accordance with the control program stored in the microcomputer 50. When the control signal indicates start of charging, the PWM control IC 23 controls the MOSFET 22 to start a switching operation. On the other hand, when the control signal indicates stop of charging, the PWM control IC 23 controls the MOSFET 22 to stop the switching operation.

The microcomputer 50, charging-current control unit 60, temperature-adjusting unit 202, battery-temperature detecting unit 120 and the like are supplied with power from the constant-voltage power supply 70. The constant-voltage power supply 70 is a DC voltage source that generates a DC voltage from the AC voltage applied from the commercially available AC power supply 1. The constant-voltage power supply 70 is composed of a power-supply transformer 71, a full-wave rectifying circuit 72, a constant voltage circuit, a three-terminal regulator 78, a smoothing capacitors 77 and 79, and a reset IC 80. The constant voltage circuit is composed of a transistor 73, a Zener diode 75 and a resistor 74. The reset IC 80 outputs a reset signal to the reset input port 55 in order to initialize the microcomputer 50 when the power switch on the battery charger 200 is turned on.

The monitor circuit 110 displays an operating mode of the battery charger 200. That is, the monitor circuit 110 displays whether the battery pack 2 has been inserted into, whether the battery charger 200 stands by since the battery temperature T of the battery pack 2 is too low or high, whether the battery pack 2 is being charged, or whether the battery pack 2 has been completely charged.

The monitor circuit 110 includes a light-emitting diode (LED) array 111 to display the operating mode. The array 111 includes a red light-emitting diode R and a green light-emitting diode G. The array 111 includes resistors 112 and 113 that control the currents supplied to the light-emitting diodes R and G, respectively. The red light-emitting diode R and the green light-emitting diode G are turned on or off based on the output from the output port 51a. When the red light-emitting diode R and the green light-emitting diode G emit light or intermittently emit light at the same time, the array 111 emits orange light or intermittently emits orange light.

[Structure of the Temperature-Adjusting Device]

FIG. 2 is a partly sectional view of the battery charger 200 and the battery pack 2 detachably mounted (engaged) on the battery charger 200. FIG. 3 is a partly sectional view of the battery charger 200 when the battery charger 200 is cut by III-III line in FIG. 2. An engagement projection 200C is provided in one end part of the battery charger 200. As a result, an engagement recess 200B is formed on the battery charger 200. An electrode is formed on the lower end of the engagement recess 200B. The fan 6 and the heater 101 are incorporated in the engagement projection 200C. A through-hole 200A through which the fan 6 blows air toward the battery pack 2 is formed in the upper surface of the engagement projection 200C.

The battery pack 2 is composed of an engagement section 2G and a main section 2H. The engagement section 2G is inserted in the engagement recess 200B of the battery charger 200. The main section 2H holds a plurality of cells 2A. As shown in FIG. 2, the battery pack 2 has a T-shaped cross section. The sensor 2B (not shown in FIG. 2) is disposed between the cells 2A to detect the battery temperature T of the battery pack 2. A circuit board 2D connected to the cells 2A and the sensor 2B is provided in the engagement section 2G. An electrode connected to the circuit board 2D is provided on the outer surface of the lower end of the engagement section 2G. Thus, the battery pack 2 is electrically connected to the battery charger 200, when the battery pack 2 is mounted on the battery charger 200. A through-hole 2C is formed in the lower surface of the main section 2H.

The through-hole 2C communicates with the through-hole 200A of the battery pack 2. Through the through-hole 200A and the through-hole 2C, hot or cold air can be applied from the temperature-adjusting unit 202 to the outer circumferential surface of battery pack 2. As shown in FIG. 3, an air outlet port 6a of the fan 6 is disposed near the heater 101. Thus, hot air can be applied from the heater 101 toward the though-hole 200A. The fan 6 is electrically connected to the fan circuit 7 (see FIG. 1) via a wire 7d. The heater 101 is electrically connected via a power line 101a to the constant-voltage power supply 70. How the fan 6 and the heater 101 are controlled will be described later.

[Operation of the Monitor Circuit]

How the monitor circuit 110 displays the operating mode of the battery charger 200 using the light-emitting diodes (LEDs) is shown in FIG. 4. To display the "before battery-insertion" state in which the battery pack 2 has not been inserted into or electrically connected to the battery charger 200, the green light-emitting diode G and the red light-emitting diode R emit light intermittently at the same time, thus performing "orange-light blinking". To display the "low-temperature standby" state in which the battery temperature T of the battery pack 2 is lower than the lower limit of the charging-temperature range (namely, T<−15° C.) and the battery stands by, only the red light-emitting diode R emits light intermittently, performing "red-light blinking." To display the "charging" state in which the battery temperature T of the battery pack 2 falls within the charging range (−15° C.≦T<55° C.) and the battery is being charged, the green light-emitting diode G and the red light-emitting diode R emit light at the same time, performing "orange-light emission." To display the "high-temperature standby" state in which the battery temperature T of the battery pack 2 is equal to or higher than the upper limit of the charging-temperature range (namely, 55° C.≦T) and the battery stands by, only the green light-emitting diode G emits light intermittently, thus performing "green-light blinking." To display the "charging completed" state in which the battery has been charged completely, only the green light-emitting diode G emits light, performing "green-light emission." Thus, the monitor circuit 110 enables the user to know the state in which the battery charger 200 is operating.

[Cell-Charging Modes]

How the microcomputer 50 controls the charging current control unit 60 and the temperature-adjusting unit 20 will be explained, with reference to FIGS. 5 and 6. In the battery charger 200 according to the present embodiment, the microcomputer 50 controls the charging current control unit 60 and the temperature-adjusting unit 202 in accordance with the battery temperature T detected by the sensor 2B. That is, the microcomputer 50 supplies a charging current appropriate to the battery temperature T, adjusting the temperature of the battery pack 2. The relation between the battery temperature T of the battery pack 2 and the charging current, and the relation between the battery temperature T and the temperature adjustment achieved by the temperature-adjusting unit 202 will be described, with reference to FIG. 5.

In the present embodiment, the temperature range in which the battery pack 2 can be charged is divided into a plurality of sub-ranges. The lower and upper limits of the charging temperature range are of such values that the lifetime of the battery may not be impaired. In this embodiment, the battery can be charged when the temperature falls within the range of −15° C.≦T<55° C., as is shown in FIG. 5.

In the present embodiment, the charging temperature range (−15° C.≦T<55° C.) is divided into four sub-ranges as shown in FIG. 5, namely into sub-range B (−15° C.≦T<0° C.), sub-range C (0° C.≦T<15° C.), sub-range D (15° C.≦T<35° C.), and sub-range E (35° C.≦T<55° C.). Further, charging currents to minimize the reduction of battery lifetime are set in accordance with the sub-ranges. Specifically, as shown in FIG. 5, charging currents of 1A, 4A, 9A and 4A are set for the sub-ranges B, C, D and E, respectively. The relation between these sub-ranges of temperature and the charging currents is stored in the ROM 56 of the microcomputer 50. The microcomputer 50 outputs a control signal based on the battery temperature T detected by the sensor 2B. The control signal causes the charging-current control unit 60 to supply the battery pack 2 with the charging current based on the battery temperature T.

This charging current tends to increase as the battery temperature T approaches an optimal temperature range (i.e., sub-range D shown in FIG. 5) that includes room temperature (25° C.). A maximum charging current of 9A is set in the optimal temperature range. On the other hand, if the battery temperature T falls within sub-range E that is above sub-range D, the charging current is set to 4A that is lower than the maximum charging current of 9A. This is because the battery temperature T will rise due to the self-heating of the battery if the battery is charged with the large current of 9A at a temperature higher than the upper limit of the optimal charging-temperature range, causing the lifetime of the lithium battery shortened as the battery is charged with the large current.

In the present embodiment, the battery pack 2 is not charged while the temperature T remains within a sub-range A (T<−15° C.) that lies below the charging temperature range. Instead, the temperature-adjusting unit 202 composed of the heater 101 and the fan 6 is driven to increase the battery temperature T into the charging temperature range. Hence, the heater 101 and the fan 6 are turned on at the same time, greatly heating the battery pack 2. When the battery temperature T rises into the charging temperature range, the charging current is set in accordance with the sub-range of temperature, and the battery is then charged.

In the present embodiment, the temperature-adjusting unit 202 is not turned off immediately even if the battery temperature T rises into a low temperature sub-range (e.g., sub-range B) of the charging temperature range and the charging is therefore started. The lithium battery generates only a small amount of heat while being charged. Therefore, the battery temperature scarcely rises if the battery is charged. Thus, as shown in FIG. 5, the heater 101 and fan 6 of the temperature-adjusting unit 202 are driven to heat the battery pack 2 in sub-ranges B and C that lie below sub-range D. That is, the temperature-adjusting unit 202 adjusts the temperature of the battery pack 2 so as to fall within the optimal charging-temperature range (i.e., sub-range D) in the present embodiment.

On the other hand, if the battery temperature T is conversely in a high temperature sub-range (i.e., sub-range E or D), the temperature-adjusting unit 202 adjusts the temperature of the battery pack 2 so as to fall within the optimal charging-temperature range (i.e., sub-range D). In this case, only the fan 6 is driven to carry out a cooling operation, as shown in FIG. 5.

In the present embodiment, the charging current and the battery temperature are thus simultaneously controlled in accordance with the battery temperature T of the battery pack 2 detected by the sensor 2B. As a result, as shown in FIGS. 6A to 6A, the charging method according to the present embodiment can be classified roughly into the following three charging modes.

Figure 6A:
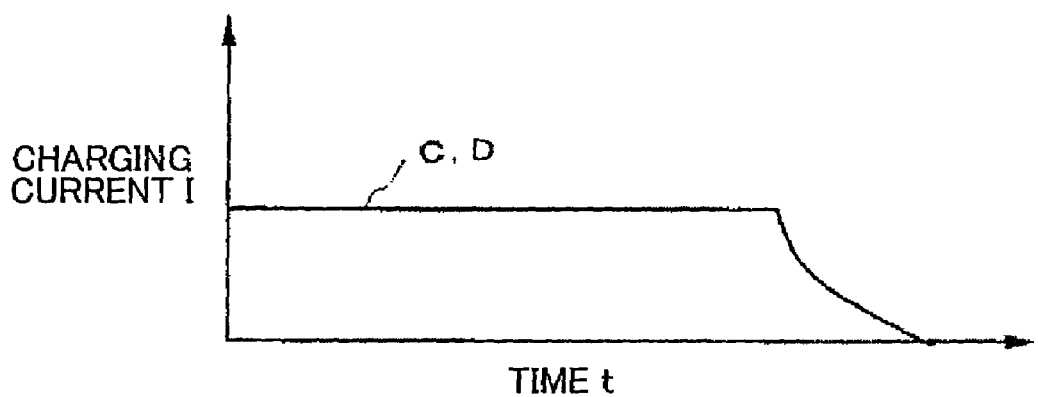
FIGS. 6A to 6C are diagrams representing various charging modes of the battery charger.

In the first mode shown in FIG. 6A, the battery is charged with a constant current. For example, charging is started when the battery temperature is in either sub-range D or sub-range C closed to the sub-range D. The supply of the constant current is continued immediately before the battery is completely charged. Note that any lithium battery is characterized in that the charging current starts decreasing when the charging voltage reaches the maximum value, and the battery is then completely charged.

Figure 6B:
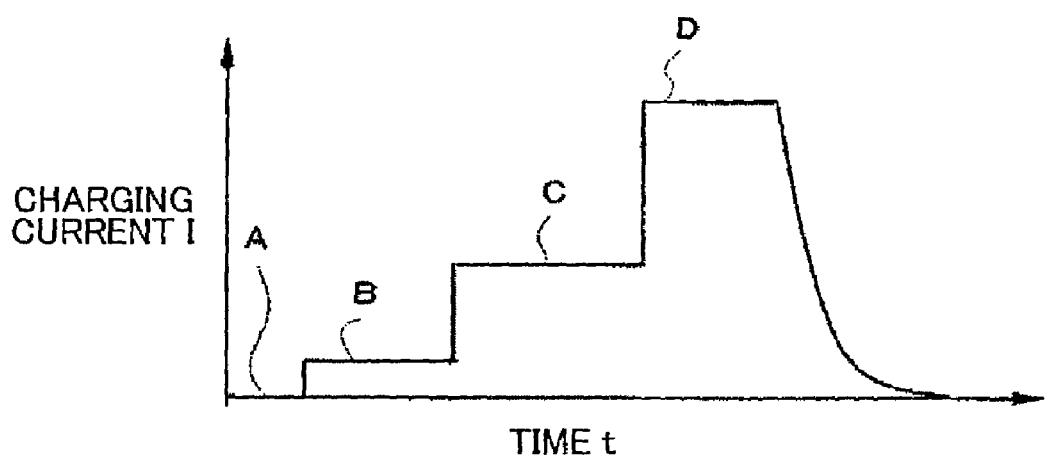

In the second mode shown in FIG. 6B, the charging current is increased stepwise in accordance with the sub-range of temperature. That is, when the battery pack 2 is inserted into (or engaged with) the battery charger 200 and the battery temperature T is in sub-range A (T<−15° C.), no charging is carried out. Instead, the temperature-adjusting unit 202 heats the battery pack 2 to a temperature within sub-range B, and then the battery is charged with a current of 1A. Since the battery pack 2 scarcely undergoes self-heating during charging, the battery pack 2 is heated to a temperature in sub-range C by the temperature-adjusting unit 202, while the battery pack 2 is being charged with a current of 4A. When the battery temperature T rises into sub-range D (15° C.≦T<35° C.), the temperature-adjusting unit 202 stops heating, and then the charging current is switched to the optimal charging current of 9A.

Figure 6C:
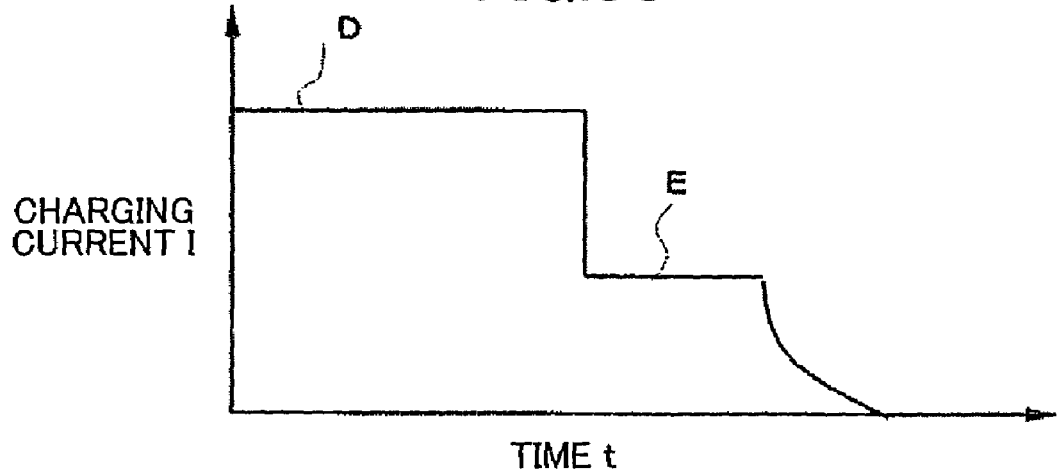

In the third mode shown in FIG. 6C, the charging current is decreased stepwise in accordance with the sub-range of temperature. More precisely, charging is started at 9A because the battery temperature T is, at first, in the sub-range D (15° C.≦T<35° C.). When the battery temperature T rises into sub-range E due to the self-heating of the battery pack 2, the charging current is decreased to 4A.

[Flowchart of the Charging]

How the battery charger 200 according to the present embodiment operates will be explained, with reference to the flowchart of FIGS. 7 and 8.

Figure 7:
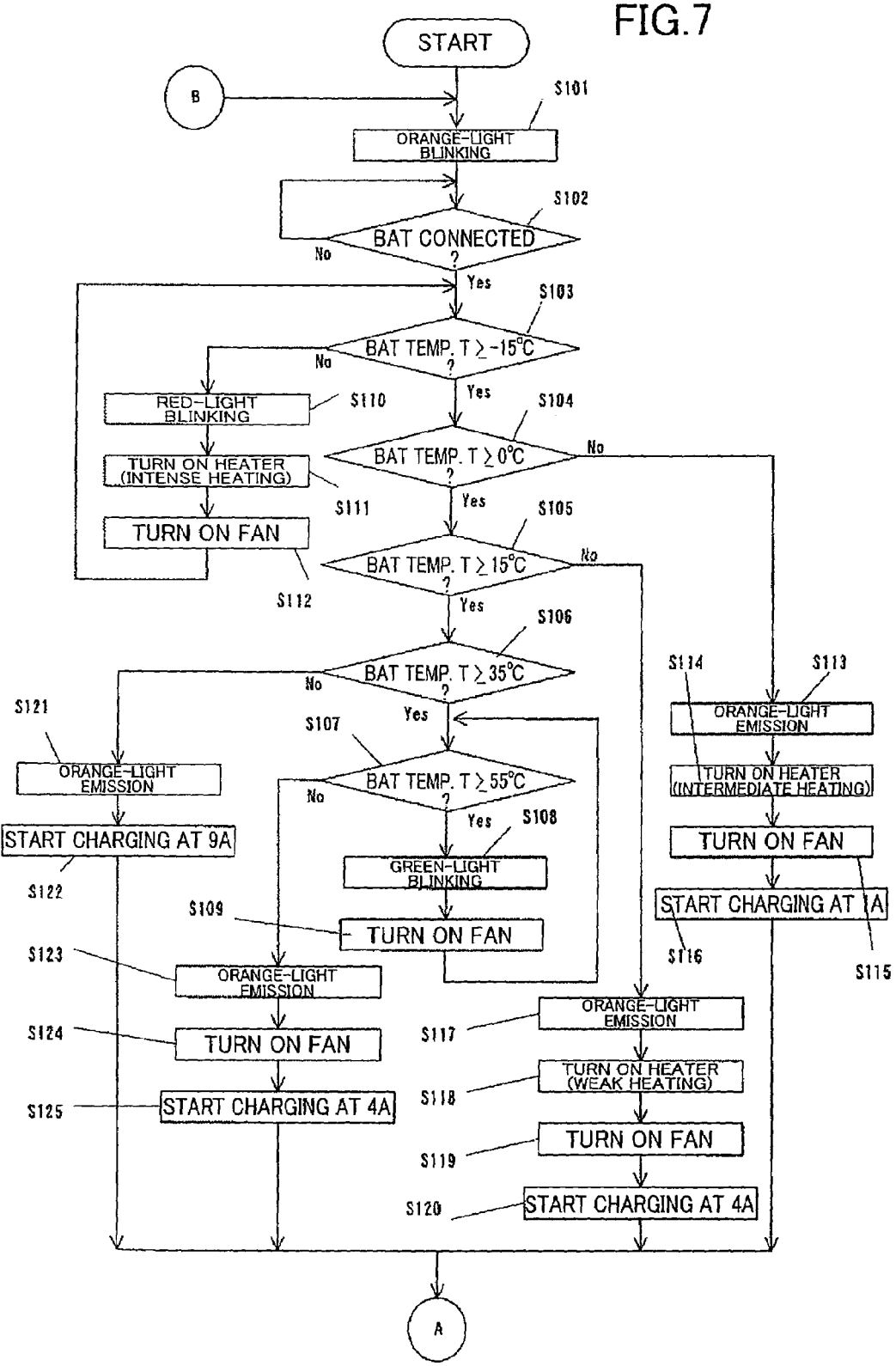
FIG. 7 is a flowchart explaining how the battery charger charges a lithium battery.

As shown in FIG. 7, the green light-emitting diode G and red light-emitting diode R of the monitor circuit 110 intermittently emit light in Step S101, performing "orange-light blinking, when the power switch on the battery charger 200 is turned on before the battery pack 2 is inserted into the battery charger 200. The monitor circuit 110 therefore displays the "before battery-insertion" state.

In Step S102, whether the battery pack 2 is inserted into the battery charger 200 and thereby electrically connected thereto is determined. If the battery pack 2 is not inserted into the battery charger 200 (Step S102: NO), the operation returns to Step S102. If the battery pack 2 is inserted into the battery charger 200 (Step S102: YES), whether the battery temperature T is beyond the sub-range A (T≧−15° C.) is determined in Step S103. If the battery temperature T is not beyond the sub-range A, that is, the battery temperature T falls within the sub-range A (Step S103: NO), the monitor circuit 110 performs "red-light blinking" in Step S110, and the heater 101 and the fan are driven to heat the battery pack 2 in Steps S111 and S112. Note that the heater 101 performs "intense heating". Then, the operation returns to Step S103.

If the battery temperature T is beyond the sub-range A (T≧−15° C.) (Step S103: YES), whether the battery temperature T is beyond the sub-range B (−15° C.≦T<0° C.) is determined in Step S104. If the battery temperature T is not beyond the sub-range B, that is, the battery temperature T falls within the sub-range B (Step S104: NO), the monitor circuit 110 performs "orange-light emission" in Step S113, and the heater 101 and the fan 6 are driven to heat the battery pack 2 in Steps S114 and S115. Note that the heater 101 performs "intermediate heating". Then, in Step S116, the battery charger 200 starts charging the battery pack 2 with current of 1A.

If the battery temperature T is beyond the sub-range B (Step S104: YES), whether the battery temperature T is beyond the sub-range C (0° C.≦T<15° C.) is determined in Step S105. If the battery temperature T is not beyond the sub-range C, that is, the battery temperature T falls within the sub-range C (Step S105: NO), the monitor circuit 110 performs "orange-light emission" in Step S117, and the heater 101 and the fan 6 are driven to heat the battery pack 2 in Steps S118 and S119. Note that the heater 101 performs "weak heating". Then, in Step S120, the battery charger 200 starts charging the battery pack 2 with current of 4A.

If the battery temperature T is beyond the sub-range C (Step S105: YES), whether the battery temperature T is beyond the sub-range D (15° C.≦T<35° C.) is determined in Step S106. If the battery temperature T is not beyond the sub-range D, that is, the battery temperature T falls within sub-range D (Step S106: NO), the monitor circuit 110 performs "orange-light emission" in Step S121, and the battery charger 200 starts charging the battery pack 2 with current of 9A in Step S122. In this case, neither the heater 101 nor the fan 6 is driven because the sub-range D is the optimal charging-temperature range.

If the battery temperature T is beyond the sub-range D (Step S106: YES), whether the battery temperature T is beyond the sub-range E (35° C.≦T<55° C.) is determined in Step S107. If the battery temperature T is not beyond the sub-range E, that is, the battery temperature T falls within sub-range E (Step S107: NO), the monitor circuit 110 performs "orange-light emission" in Step S123, and the fan 6 is driven to cool the battery pack 2 in Step S124. In this case, the heater 101 is not driven. Then, the battery charger 200 starts charging the battery pack 2 with current of 4A in Step S125.

If the battery temperature T is beyond the sub-range E (Step S107: YES), that is, the battery temperature T falls within the sub-range F (T≦55° C.), the monitor circuit 110 performs "green-light blinking" in Step S108, and the fan 6 is driven to cool the battery pack 2 in Step S109. Then, the operation returns to Step S107. In this case, Charging of the battery is not performed until the battery temperature T decreases into the sub-range E.

As shown in FIG. 8, the battery temperature T is periodically checked after the battery charger 200 has started charging the battery pack 2 in FIG. 7.

First, whether the battery temperature T is beyond the optimal charging-temperature range (i.e., sub-range D), that is, whether the battery temperature T is equal to or higher than 35° C. (T≧35° C.) is determined in Step S126. If the battery temperature T is beyond the sub-range D (Step S126: YES), the heater 101 is turned off in Step S132, and the fan 6 is turned on in Step S133 in order to cool the battery pack 2. Then the charging current is switched to 4A in Step S134.

If the battery temperature T is not beyond the sub-range D (Step S126: NO), whether the battery temperature T falls within the sub-range D (15° C.≦T<35° C.), that is, whether the battery temperature T is equal to or higher than 15° C. (T≧15° C.) is determined in Step S127. If the battery temperature T falls within sub-range D (Step S127: YES), the heater 101 is turned off in Step S135, and the fan 6 is turned off in Step S136. Then, the charging current is switched to 9A in Step S137. In this case, neither the heater 101 nor the fan 6 is driven because the sub-range D is the optimal charging-temperature range.

If the battery temperature T does not fall within sub-range D (Step S127: NO), whether the battery temperature T falls within the sub-range C (0° C.≦T<15° C.) is determined in Step S128. If the battery temperature T falls within sub-range C (Step S128: YES), the heater 101 is turned on in Step S129, and the fan 6 is turned on in Step S130 in order to heat the battery pack 2. Note that the heater 101 performs "weak heating". Then, the charging current is switched to 4A in Step S131.

If the battery temperature T does not fall within the sub-range C (Step S128: NO), the battery temperature T falls within the sub-range B since the battery temperature is beyond the sub-range A in FIG. 5. Then, the heater 101 is turned on in Step S138, and the fan 6 is turned on in Step S139. Note that the heater 101 performs "intermediate heating". Then, the charging current is switched to 1A in Step S140.

When the battery pack 2 is charged almost completely, the voltage to which the battery pack 2 is charged reaches the maximum value, and then the charging current decreases. In Step S141, whether the battery has been fully charged is determined. If the battery has been fully charged (Step S141: YES), the monitor circuit 110 performs "green-light emission" indicating that the battery has been completely charged in Step S142.

In the present embodiment, after the battery pack 2 has been charged completely, the temperature-adjusting unit 202 carries out temperature adjustment in order to lengthen the lifetime of the battery pack 2 (Steps S143 to S153). Specifically, the temperature-adjusting unit 202 adjusts the battery temperature T to fall into the optimal charging-temperature range (15° C.≦T<35° C.). In Step S154, whether the battery pack 2 has been removed from the battery charger 200 is determined. If the battery pack 2 has been removed (Step S154: YES), the operation returns to Step S101. Then, the battery charger 200 remains in the standby mode until a battery pack 2 is connected to the battery charger 200.

As described above, the battery charger according to the present embodiment can charge a lithium battery, while controlling the charging current and the battery temperature in accordance with the battery temperature of the battery pack containing the battery. Thus, the charging mode can be set on the basis of the battery temperature.

Hitherto, if a large charging current is applied to a lithium battery at low temperatures, the battery characteristics, such as lifetime, may be impaired because the lithium battery scarcely undergoes self-heating. Since the battery charger according to the present embodiment can charge a battery, while controlling the battery temperature and switching one charging current to another, the time required to charge the battery can therefore be shortened without influencing the battery characteristics such as lifetime. In particular, when used at a working site in a cold region, together with cordless electric tools incorporating a battery pack, the battery charger according to the present embodiment can accomplish a rapid charging, helping to enhance the work efficiency at the site.

While the invention has been described in detail with reference to the specific embodiment thereof, it would be apparent to those skilled in the art that various changes and modifications may be made therein without departing from the spirit of the invention.

For example, the charging-temperature range is divided into the sub-ranges B to E in the present embodiment. However, the charging-temperature range is divided into more sub-ranges.

What is claimed is:

1. A battery charger for charging a lithium-ion battery, comprising:
    a temperature control unit that controls a temperature of the lithium-ion battery to fall in a predetermined range, the predetermined range being divided into a plurality of sub-divided temperature ranges; and
    a current supplying unit that supplies the lithium-ion battery with a temperature-dependent current relation to a sub-divided temperature range in which the temperature of the lithium-ion battery falls.

2. The battery charger according to claim 1, wherein the temperature control unit controls the temperature of the lithium-ion battery to fall in a target sub-divided temperature range in one of the plurality of the plurality of sub-divided temperature ranges.

3. The battery charger according to claim 1, wherein the temperature control unit controls the temperature of the lithium-ion battery to fall in the predetermined range when the temperature of the lithium-ion battery is out of the predetermined range.

4. The battery charger according to claim 1, wherein the current supplying unit does not supply the lithium-ion battery with the temperature-dependent current when the temperature of the lithium-ion battery is out of the predetermined range.

5. The battery charger according to claim 2, wherein the temperature control unit does not control the temperature of the lithium-ion battery when the temperature of the lithium-ion battery falls in the target sub-divided temperature range.

6. The battery charger according to claim 1, wherein the predetermined range is from −15° C. to 55° C.

7. The battery charger according claim 2, wherein the target sub-divided temperature range is from 15° C. to 35° C.

8. The battery charger according to claim 1, wherein the temperature control unit comprises:
    a heating unit that increases the temperature of the lithium-ion battery; and
    a cooling unit that decreases the temperature of the lithium-ion battery.

9. The battery charger according to claim 1, wherein the temperature control unit comprises a heater and a fan.

10. The battery charger according to claim 9, wherein temperature control unit operates both of the heater and the fan to increase the temperature of the lithium-ion battery, and operates only the fan to decrease the temperature of the lithium-ion battery.

11. The battery charger according to claim 9, further comprising an engage portion engaged with the lithium-ion battery, wherein the heater and the fan are opposed to the lithium-ion battery engaged with the engage portion.

12. The battery charger according to claim 9, wherein the heater changes an amount of heat corresponding to the sub-divided temperature range.

13. The battery charger according to claim 11, wherein a through-hole is formed on the engage portion so that the fan blows air through the through-hole toward the lithium-ion battery.

14. The battery charger according to claim 1, further comprising a full-charging detecting unit that detects that the lithium-ion battery has been charged fully, wherein the temperature control unit continues controlling the temperature of the lithium-ion battery after the full-charging has been detected.

15. A battery charger for charging a lithium-ion battery, comprising:
    a temperature control unit that controls a temperature of the lithium-ion battery to fall in a predetermined range, the predetermined range being divided into a plurality of sub-divided temperature ranges;
    a memory that stores a table that indicates a current relation to each sub-divided temperature range;

a current determining unit that identifies a sub-divided temperature range in which the temperature of the lithium-ion battery falls, and determines a current while referring to the table; and a current supplying unit that supplies the lithium-ion battery with the current by the current determining unit.

16. The battery charger according to claim 15, wherein each current is constant.

17. The battery charger according to claim 15, wherein the temperature control unit controls the temperature of the lithium-ion battery to fall in a target sub-divided temperature range in one of the plurality of the plurality of sub-divided temperature ranges.

18. The battery charger according to claim 15, wherein the temperature control unit controls the temperature of the lithium-ion battery to fall in the predetermined range when the temperature of the lithium-ion battery is out of the predetermined range.

19. The battery charger according to claim 15, wherein the current supplying unit does not supply the lithium-ion battery with the current when the temperature of the lithium-ion battery is out of the predetermined range.

20. The battery charger according to claim 16, wherein the temperature control unit does not control the temperature of the lithium-ion battery when the temperature of the lithium-ion battery falls in the target sub-divided temperature range.

21. The battery charger according to claim 15, wherein the predetermined range is from −15° C. to 55° C.

22. The battery charger according claim 16, wherein the target sub-divided temperature range is from 15° C. to 35° C.

23. The battery charger according to claim 15, wherein the temperature control unit comprises:

a heating unit that increases the temperature of the lithium-ion battery; and a cooling unit that decreases the temperature of the lithium-ion battery.

24. The battery charger according to claim 15, wherein the temperature control unit comprises a heater and a fan.

25. The battery charger according to claim 24, wherein temperature control unit operates both of the heater and the fan to increase the temperature of the lithium-ion battery, and operates only the fan to decrease the temperature of the lithium-ion battery.

26. The battery charger according to claim 24, further comprising an engage portion engaged with the lithium-ion battery, wherein the heater and the fan are opposed to the lithium-ion battery engaged with the engage portion.

27. The battery charger according to claim 24, wherein the heater changes an amount of heat corresponding to the sub-divided temperature range.

28. The battery charger according to claim 26, wherein a through-hole is formed on the engage portion so that the fan blows air through the through-hole toward the lithium-ion battery.

29. The battery charger according to claim 15, further comprising a full-charging detecting unit that detects that the lithium-ion battery has been charged fully, wherein the temperature control unit continues controlling the temperature of the lithium-ion battery after the full-charging has been detected.

* * * * *